United States Patent [19]
Jones et al.

[11] 4,063,344
[45] Dec. 20, 1977

[54] METHODS FOR FORMING A HIGH TEMPERATURE AND SHOCK RESISTANT INSULATED PIPE

[75] Inventors: Henry B. Jones; Dorrance P. Bunn, Jr., both of Houston, Tex.

[73] Assignee: Texaco Inc., New York, N.Y.

[21] Appl. No.: 754,789

[22] Filed: Dec. 27, 1976

[51] Int. Cl.² ............... B21D 39/00; B23P 19/04
[52] U.S. Cl. ............................. 29/455 R; 29/460; 138/145; 138/149
[58] Field of Search ............ 29/455, 460; 138/145, 138/149

[56] References Cited

U.S. PATENT DOCUMENTS

| | | | |
|---|---|---|---|
| 2,361,383 | 10/1944 | Coffman | 138/149 |
| 2,534,811 | 12/1950 | Corlett | 138/149 X |
| 3,087,515 | 4/1963 | Venable et al. | 138/149 X |
| 3,155,117 | 11/1964 | Spillmann | 138/149 |
| 3,369,826 | 2/1968 | Boosey et al. | 138/149 X |
| 3,439,885 | 4/1969 | Sackleh | 29/455 X |
| 3,587,198 | 6/1971 | Hensel | 29/460 X |
| 3,810,491 | 5/1974 | Hildebrandt | 138/149 |
| 3,861,022 | 1/1975 | Hildebrandt et al. | 29/455 |
| 3,892,032 | 7/1975 | Bagnulo | 29/460 X |

FOREIGN PATENT DOCUMENTS

| | | | |
|---|---|---|---|
| 1,271 | 1/1905 | United Kingdom | 138/149 |

*Primary Examiner*—Charlie T. Moon
*Attorney, Agent, or Firm*—Carl G. Ries; Thomas H. Whaley; Theron H. Nichols

[57] ABSTRACT

A method for forming an insulated pipe resistant to high temperatures and great shock forces comprises basically, forming a batt of fiber felt to the inner surface of the pipe, securing a high temperature resistant metal shield over the inner surface of the fiber felt batt, and forming an erosion resistant castable refractory over the inner surface of the high temperature resistant metal shield.

12 Claims, 2 Drawing Figures

METHODS FOR FORMING A HIGH TEMPERATURE AND SHOCK RESISTANT INSULATED PIPE

BACKGROUND OF THE INVENTION

This invention pertains to a few methods for forming a high temperature and shock resistant insulated pipe, particularly large diameter pipes carrying high temperature gases and/or fluidized solids.

An exemplary pipe is a fluid catalytic cracking unit (FCCU) regenerator flue gas line for carrying gases at temperatures generally in the range of 1,000° F. to 1,500° F. (538° C.–816° C.) and pressures in the range of 1 to 4 atmospheres, absolute (1.033Kg/cm$^2$–4.133 Kg/cm$^2$).

Various methods of forming various insulated pipes have been used, but the problems of providing a minimum of expansion in the pipe by having very good internal insulation and having the internal insulation strong enough to withstand stress due to pressure variations and solids flowing at high velocities therein are difficult to solve. Another problem to solve or purpose is to obviate high alloy construction where temperatures exceed those for which allowable stress values are set for carbon steel and low alloy steels, which steels are desired to be used in pipes. Two types of insulation for pipes have been used but they fail to withstand flowing conditions and/or stresses encounterest in service.

1. Jacketed insulation (batts or block)

Materials having good insulating properties are usually low in mechanical strength. They have been used with a covering of metal sheet to protect them from damage by the high velocity flowing gas stream. These linings have had a relatively short service life. Metal sheeting has generally been eroded, torn or otherwise damaged, and insulation has been removed by the gas flow. Wrinkling of the metal due to differential expansion, in excess of that allowed for, is thought to have been a factor in some of these failures.

2. Castable, or gun-applied, insulation

These linings may be monolithic applications of a medium weight refractory castable or a two component lining consisting of a layer of a light weight insulating castable protected by a layer of an erosion resistant, high density, refractory castable reinforced with carbon steel or an alloy steel hex metal grating. These have failed repeatedly in areas where lines are subject to vibration, particularly near regenerator flue gas slide valves and orifice chambers. In other cases, a castable insulating lining has been covered with a thin gauge metal jacket. In the latter cases, the metal sheet would apparently expand, vibrate, become wrinkled, flop around, and eventually tear loose, followed by deterioration of the castable insulating lining.

OBJECTS OF THE INVENTION

Accordingly, a principal object of this invention is to provide a method for making a pipe high temperature and shock resistant in resisting high velocity gas or fluidized solids flowing therein.

Another object of this invention is to provide a method for forming an insulated pipe in which one layer of the internal insulation will withstand high vibration and shock forces while another layer of the internal insulation will withstand high temperatures and erosive forces.

A further object of this invention is to provide a method for forming a thinner effective internal pipe insulation allowing use of a smaller diameter pressure containing pipe having a greater flexibility to accommodate thermal expansion.

A still further object of this invention is to provide a method for forming an internally insulated pipe that is easy to maintain, is of simple configuration, is economical to use, provides greater insulating efficiency, has high temperature resistance, and has high mechanical strength.

Other objects and various advantages of the disclosed method for forming a high temperature and shock resistant insulated pipe will be apparent from the following detailed description, together with the accompanying drawings, submitted for purposes of illustration only and not intended to define the scope of the invention, reference being made for that purpose to the subjoined claims.

BRIEF DESCRIPTION OF THE DRAWINGS

The drawings diagrammatically illustrate by way of example, not by way of limitation, one form or mechanism formed by the methods of the invention wherein like reference numerals have been employed to indicate similar parts in the several views in which.

DESCRIPTION OF THE INVENTION

The invention disclosed herein, the scope of which being defined in the appended claims, is not limited in its application to the details of construction and arrangement of parts shown and described for carrying out the disclosed methods, since the invention is capable of other embodiments for carrying out other methods and of being practiced or carried out in various other ways. Also, it is to be understood that the phraseology or terminology employed herein is for the purpose of description and not of limitation. Further, many modifications and variations of the invention as hereinbefore set forth will occur to those skilled in the art. Therefore, all such modifications and variations which are within the spirit and scope of the invention herein are included and only such limitations should be imposed as are indicated in the appended claims.

DESCRIPTION OF THE METHODS

This invention comprises a few methods for forming a high temperature and shock resistant insulated pipe and illustrates one insulated pipe formed thereby.

Figure 1:
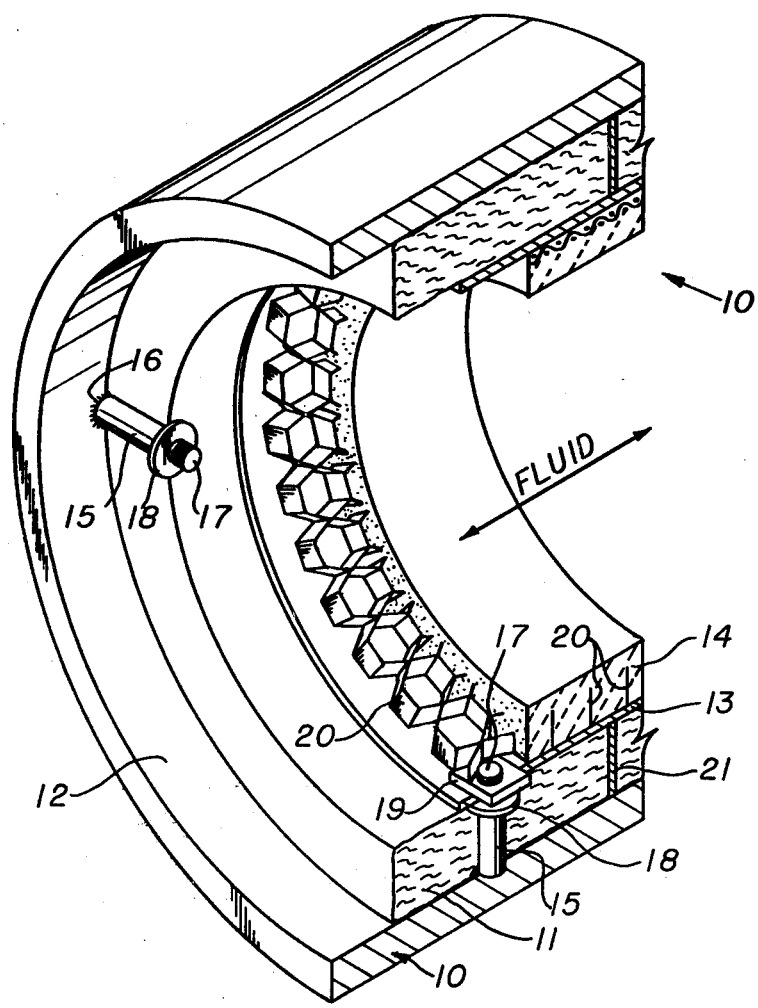
FIG. 1 is a perspective, sectional view of a portion of the new insulated pipe illustrating details of the insulation therein.
Figure 2:
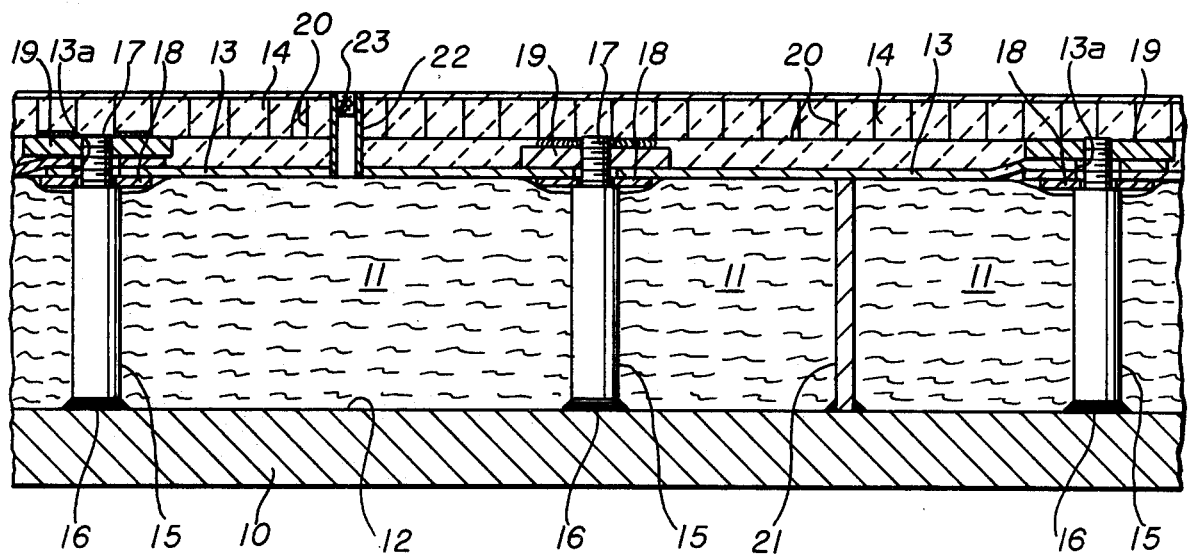
FIG. 2 is a schematic diagrammatic longitudinal vertical sectional view of the wall portion of a pipe with the new high temperature and shock resistant insulation mounted therein.

The basic method for forming a pipe which is high temperature and shock resistant, particularly in resisting vibrations due to passage therein of high velocity gas or fluidized solids at high temperatures in the range of 1,000° F. to 1,500° F. comprises the following steps, the final product being illustrated in FIGS. 1 and 2:

1. forming or fastening a batt of fiber felt 11, as a ceramic fiber 2 to 6 inches (5–15 cm) thick to the inner surface 12 of a pipe 10 as of carbon or a low alloy steel ½ to 2 inches (1.25–5 cm) thick;

2. securing or positioning a high temperature resistant metal shield 13, as overlapping sheets of stainless steel, over the inner surface of the fiber felt batt 11 in the pipe;

3. forming and fixedly securing a metal grating reinforcement for an erosion resistant castable refractory 14 over the inner surface of the high temperature resistant metal shield 13; and 4. gunning or trowelling an erosion and high temperature resistant castable refractory material to fill all void space from the inner surface of the high temperature resistant metal shield 13 to the inner surface of the formed sheets of metal grating reinforcement 20 for forming a high temperature resistant and high mechanical strength insulated pipe.

MORE METHODS

Method step (1) of the above method may include the following steps, 1. rigidly securing a plurality of studs 15 to the inner surface of the pipe, 2. positioning or laying the thick ceramic fiber batt 11 having a thickness substantially equal to the length of the studs 15 on the pipe inner surface 12 around the studs, and 3. fixedly securing a fastening plate 18 on top of each stud for firmly holding the thick ceramic fiber batt against the pipe inner surface.

Method step (2) of the above basic method may comprise the following steps:

1. fixedly securing one end of each of a plurality of studs 15 to the pipe inner surface 12 with the stud opposite ends formed slender or of reduced size, 2. forming oversize holes in the stainless steel sheets, 3. placing the stainless steel sheets 13 over the studs with the stud slender ends protruding through the oversize holes in the stainless steel sheet to retain the fiber felt batt against the pipe inner surface overlapping adjoining sheets at appropriately selected lines of studs, and 4. securing fastening plate means on the stud slender ends for securing the stainless steel sheet over the ceramic fiber batt.

Method step (3) of the above basic method may comprise the following steps:

1. fixedly mounting studs 15 on the pipe inner surface 12 protruding inwardly through both the thick fiber felt batt 11 and the high temperature resistant metal sheet 13, 2. securely fixing, as by welding, a metal grating 20 to plates on the stud inner ends, and 3. trowelling an erosion resistant castable refractory 14 into the metal grating to leave a smooth hard inner erosion resistant surface.

Another method which adds a few steps to the above recited basic method comprises the following additional method steps:

1. rigidly fastening a vapor stop ring 21 to the pipe inner wall surface 10, 2. extending the vapor stop ring through the ceramic fiber batt 11 to the high temperature resistant metal sheet, and 3. forming a vent hole through the erosion resistant castable refractory for venting the fluid vapors from internally of the insulation for preventing pressure buildup and damage therein.

DESCRIPTION OF AN APPARATUS FORMED BY THE ABOVE METHODS

While various devices may be utilized for carrying out or practicing the inventive methods, FIGS. 1 and 2 illustrate at least one inventive apparatus formed by the methods described above.

The disclosed high temperature and shock resistant insulated pipe 10, FIGS. 1 and 2, for transporting high velocity gas or fluidized solids comprises basically three components or elements:

1. a batt of fiber felt 11 as ceramic fiber secured to the inner cylindrical surface 12 of the pipe, 2. a high temperature resistant and tough metal shield 13, as a sheet of stainless steel mounted contiguous with the inner surface of the fiber felt batt and secured to the pipe inner surface, and 3. an erosion resistant and metal reinforced castable refractory 14 mounted contiguous with the inner surface of the thin high temperature resistant and tough metal shield and secured to the pipe inner surface.

A typical example of the invention is an FCCU regenerator flue gas line or insulated pipe 10, FIGS. 1 and 2, from 3 feet to 10 feet in diameter for carrying 1,000° F.–1,500° F. gases at pressures from 1 to 4 atmospheres (absolute). The pipe 10 or vessel wall may comprise a carbon or low alloy steel material ½ to 2 inches (1.25–5 cm) thick. 18–8 stainless steel studs 15 are welded to the inner surface 12 of the pipe 10 on a staggered pattern with about 9 inch (22.5 cm) spacing. Studs 15 have large ends 16 and smaller ends 17. The stud large ends 16 are fixedly secured, as by welding, to the pipe inner surface 12 and the opposite smaller stud ends 17 are threaded. The length of the studs is slightly less than the uncompressed thickness of the sheets or batts of fiber felt, such as but not limited to, ceramic fiber 11.

After the batts of fiber felt or ceramic fiber 11, FIGS. 1 or 2, are impaled on the studs and pressed against the pipe inner surface 12, retaining means such as but not limited to press fit or threaded plates, washers or nuts 18 of 18–8 stainless steel, for example, are placed and secured on the stud inner smaller ends 17 to press the batts of ceramic fiber down slightly to maintain them firmly against the pipe inner wall surface 12.

A high temperature resistant and tough metal shield 13, FIGS. 1 and 2, such as but not limited to, overlapping sheets of 18–8 stainless steel, having oversize holes 13a to allow for differential expansion is positioned on top of the batt of ceramic fiber 11 and the studs 15. The stud smaller, threaded ends 17 protrude through the oversize holes in stainless steel sheets 13 and a fastening means, such as but not limited to, threaded plates, washers, or nuts such as 2 inch square by ¼ inch thick washers 19 with threaded holes are placed on and secured as by being threaded on or welded to the stud smaller ends 17 for securing the stainless steel shield 13 down in pipe 10.

The third basic and innermost element or component to be fastened down in the pipe 10, FIG. 2, is the erosion resistant and metal reinforced castable refractory 14 which comprises an erosion resistant castable refractory means impregnated with a metal grating means 20. The latter grating means 20 may comprise a ¾ inch thick 18–8 stainless steel, carbon steel, or a low alloy steel Hexmetal grating preformed by the proper radius of curvature and fixedly secured as by welding to the square washers. The reinforcing grating 20 must extend from the surface of the washers 19 to the inner surface of the refractory 14. Thus the castable refractory will fill all voids from the inner surface of the grating outwardly to the inner surface of the metal shield, including the space approximating the thickness of the square washers between the outer surface of the grating and the inner surface of the metal shield.

FIG. 2 discloses further a vapor stop ring 21 fixedly secured, as by welding, to the inner surface 12 of the pipe and coaxial therewith. This ring likewise may be formed of 18-8 stainless steel and extends inwardly of the pipe from the pipe inner surface of the thin high temperature resistant and tough metal shield 13. Several rings 21 are formed and spaced between 3 and 5 feet apart along the length of the above exemplary pipe. A vent pipe 22, as of ¼ inch 18-8 stainless steel tubing, protrudes radially through the erosion resistant castable refractory between each two vapor stop rings and has a removable or burnable plug 23 initially pressed therein. With the vapor stop ring and the vent pipe therein, the vapor trapped in the insulation may escape upon heating thereof as the 1,000° F. to 1,500° F. fluids flow through the pipe.

Accordingly, a very efficient high temperature and shock resistant insulated pipe is disclosed. Since the thermal conductivity of fiber felt as a ceramic fiber is far lower than the thermal conductivity of insulating castable materials, the insulating value of this pipe lining will be significantly greater than that of the known castable lining for pipes.

Thus, the disclosed lining may be thinner and thus may be used in smaller pipes and greater flexibility to accommodate thermal expansion results.

A very important feature is that the resilience of the fiber felt or ceramic fiber layer will dampen pipe wall vibrations and accordingly reduce the likelihood of damage to the inelastic castable refractory.

Further in the event the castable refractory 14 is shaken out of the Hexmetal grating 20 by extreme vibrations or due to faulty installation, the ceramic fiber insulation 11 will be held in place by the shield of 18-8 stainless steel sheets 13 and which shield will be protected by the Hexmetal grating.

Thus the novel combination of elements or components of a fiber felt batt 11, a high temperature resistant metal shield 13, and the erosion resistant and metal reinforced castable refractory 14 formed in a pipe form the new high temperature and shock resistant insulated pipe.

Obviously other methods may be utilized for forming the embodiments of FIGS. 1 and 2 than those listed above, depending on the particular fluid desired to be transmitted in the insulated pipe.

Accordingly, it will be seen that the above disclosed methods will operate in a manner which meets each of the objects set forth hereinbefore.

While only a few methods of the invention and one mechanism formed by the methods has been disclosed, it will be evident that various other methods and modifications are possible without departing from the scope of the invention and it is accordingly desired to comprehend within the purview of this invention such modifications as may be considered to fall within the scope of the appended claims.

We claim:

1. A method for making a pipe high temperature and shock resistant for resisting vibrations due to passage therein of high velocity gas or fluidized solids at elevated temperatures comprising the steps of,
    a. forming a batt of fiber felt to the inner surface of a pipe,
    b. securing a high temperature resistant metal shield over the inner surface of the fiber felt batt in the pipe, and
    c. forming an erosion resistant castable refractory over the inner surface of the high temperature resistant metal shield for forming a high temperature resistant and high mechanical strength insulation in the pipe.

2. A method as recited in claim 1 wherein the first step comprises,
    a. forming the batt of fiber felt of ceramic fiber whereby the outer layer secured to the pipe inner surface is a ceramic fiber batt.

3. A method as recited in claim 2 wherein the first step comprises,
    a. rigidly securing a plurality of studs to the inner surface of the pipe,
    b. positioning the ceramic fiber batt having a thickness substantially equal to the length of the studs on the pipe inner surface around the studs, and
    c. securing a fastening plate on top of each stud for firmly holding the thick ceramic fiber batt against the pipe inner surface.

4. A method as recited in claim 1 wherein the second step comprises,
    a. fixedly securing one end of each of a plurality of studs to the inner surface of the pipe with the stud opposite ends formed slender,
    b. forming the high temperature resistant metal shield of stainless steel sheets with oversize holes therein,
    c. placing the stainless steel sheets over the studs with the slender ends of the studs protruding through the oversize holes in the stainless steel sheet to retain the thick fiber felt batt against the pipe inner surface overlapping adjoining sheets at appropriately selected lines of studs, and
    d. securing fastening plate means on the slender ends of the studs for securing the stainless steel shield over the ceramic fiber batt.

5. A method as recited in claim 1 wherein the third step comprises,
    a. mounting studs on the inner surface of the pipe protruding inwardly through both the thick fiber felt batt and the high temperature resistant metal shield,
    b. fixedly securing a metal grating to the ends of the studs, and
    c. troweling an erosion resistant castable refractory into the metal grating to leave a smooth hard inner erosion resistant surface.

6. A method as recited in claim 1 including the following steps,
    a. rigidly fastening a vapor stop ring to the pipe inner wall,
    b. extending the vapor stop ring through the thick ceramic fiber batt to the high temperature resistant metal shield, and
    c. forming a vent hole through the erosion resistant castable refractory for venting the fluid vapors from internally of the insulation for preventing pressure buildup and damage therein.

7. A method for forming a high temperature, shock resistant pipe comprising the steps of,
    a. fastening a batt of fiber felt to the inner surface of a pipe, b. positioning a shield of high temperature resistant metal over the inner surface of the batt of fiber felt, and c. fixedly securing an erosion resistant castable refractory in the pipe over the thin sheet of high temperature resistant metal for forming a high temperature, shock resistant pipe.

8. A method as recited in claim 7 wherein the first method step comprises further, a. forming the batt of fiber felt of ceramic fiber, and b. fastening the batt of ceramic fiber to the pipe inner surface.

9. A method as recited in claim 7 wherein the first step comprises, a. fixedly securing a plurality of studs to the inner surface of the pipe, b. laying the batt of ceramic fiber having a thickness substantially equal to the length of the studs over the pipe inner surface around the studs, and c. rigidly securing fastening plates on top of each stud for firmly holding the ceramic fiber batt against the pipe inner surface.

10. A method as recited in claim 7 wherein the second step comprises, a. forming the shield of high temperature resistant metal of stainless steel sheets with a plurality of oversize holes therein, b. positioning the stainless steel sheet over the studs slender upper ends protruding through the oversize holes in the stainless steel sheets to cover the thick batt of fiber felt overlapping adjoining sheets at appropriately selected lines of studs, and c. fixedly securing fastening plate means on the slender ends of the studs for securing the stainless steel shield over the batt of ceramic fiber.

11. A method as recited in claim 7 wherein the third step comprises, a. fixedly mounting studs on the inner surface of the pipe protruding inwardly through both the thick batt of fiber felt and the shield of high temperature resistant metal, b. securing a layer of metal grating to the ends of the studs, and c. trowelling an erosion resistant castable refractory into the metal grating to leave a smooth hard inner surface.

12. A method as recited in claim 7 including the following steps, a. securing a vapor stop ring to the pipe inner wall, b. protruding the vapor stop ring through the thick batt of fiber felt to the sheet of high temperature resistant metal, and c. cutting a vent hole through the erosion resistant castable refractory and the metal shield for venting the fluid vapors from inside of the insulation for preventing buildup of pressure and damage therein.

* * * * *